(No Model.) 2 Sheets—Sheet 1.
Z. SPRAGUE.
VEHICLE WHEEL.
No. 271,531. Patented Jan. 30, 1883.
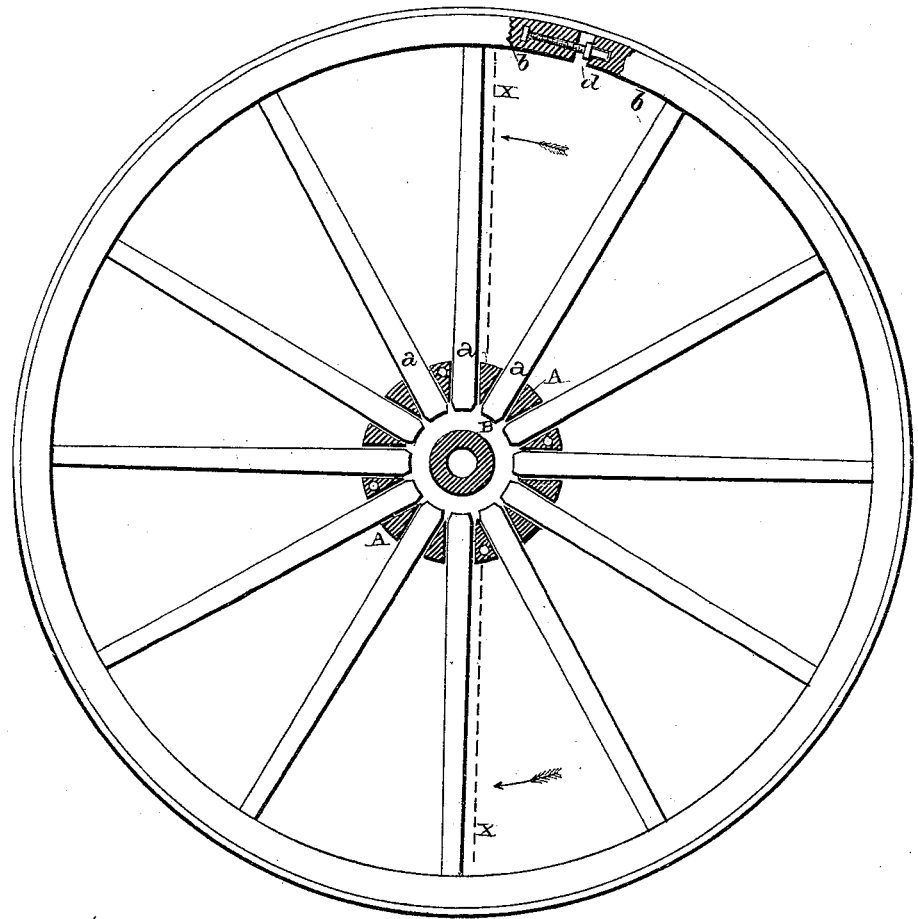
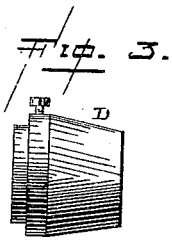
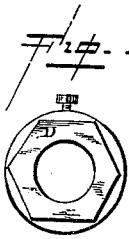
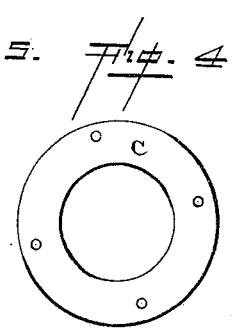
Witnesses.
Louis F. Gardner
E. D. York
Inventor.
Zebulon Sprague,
per
J. B. Webster,
Atty.

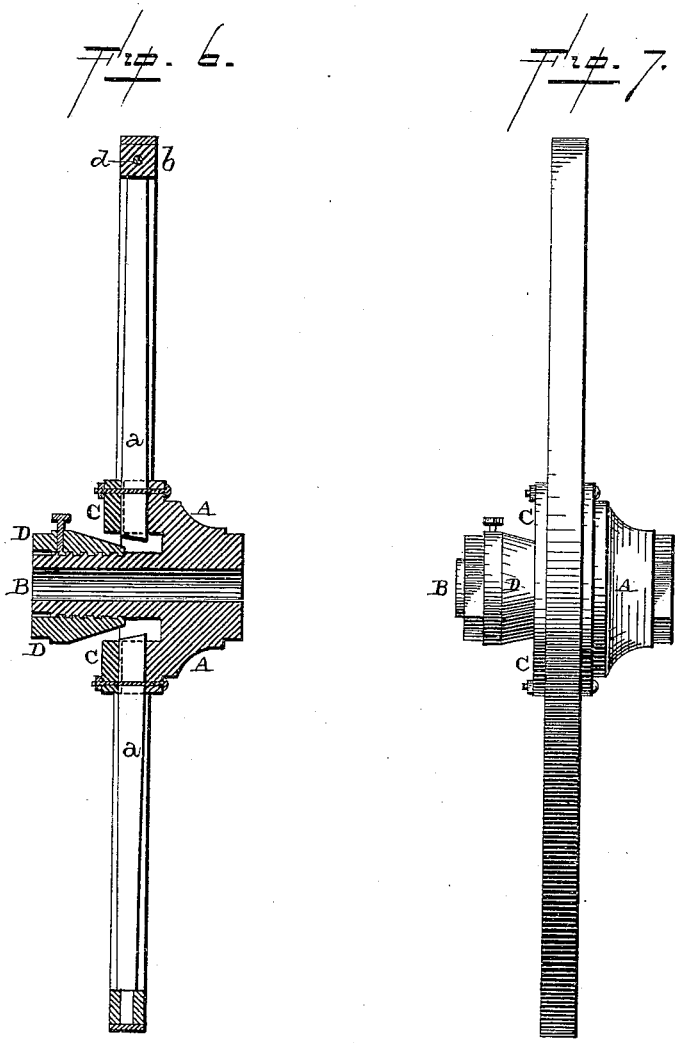

UNITED STATES PATENT OFFICE.

ZEBULON SPRAGUE, OF STOCKTON, CALIFORNIA.

VEHICLE-WHEEL.

SPECIFICATION forming part of Letters Patent No. 271,531, dated January 30, 1883.

Application filed September 23, 1882. (No model.)

*To all whom it may concern:*

Be it known that I, ZEBULON SPRAGUE, a citizen of the United States, residing at Stockton, in the county of San Joaquin and State of California, have invented certain new and useful Improvements in Vehicle-Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1 is a sectional side view of the wheel with the hub-flange, Figs. 4 and 5, and the conical nut, Figs. 2 and 3, removed. Fig. 2 is an end view of the conical nut. Fig. 3 is a side view of the same. Fig. 5 is a front view of the hub-flange, and Fig. 4 is a plan of the same. Fig. 6 is a sectional elevation of the wheel on the line X X of Fig. 1. Fig. 7 is an end elevation of the complete wheel.

Similar letters of reference indicate corresponding parts.

The object of my invention is to provide a wheel the rim or fellies of which may be tightened or loosened as the tire expands or contracts without cutting the tire or removing it from the fellies, and the ends of the spokes of which shall always be perfectly tight in the sockets or mortises of the hub and tenon-holes of the fellies.

My invention consists in the arrangement and combination of parts, that will be more fully described hereinafter, whereby the tire can be tightened whenever necessary.

In the drawings, A represents the solid cast section of the hub or nave; B, the box with the screw-threads cut thereon; D, the conical nut engaging with the screw-threads of box B, and held solidly to its position by a set-screw or other suitable device; C, the detachable flange, which has a circular opening, permitting it to slip over the box B and the conical nut D, and is secured to the inside vertical face of the nave A by screw-bolts, so as to firmly hold the radial spokes *a* in the sockets of the nave A. The outer ends of the spokes *a* are tenoned into the fellies, as usual.

*b b* are the felly-sections, having, as described, a screw-bolt, *d*, in the head of one and a nut, *d'*, in the head of the other.

It will be seen that if the tire expands it may be tightened upon the fellies by unscrewing the bolt *d*, setting apart the felly-sections *b b*, and by screwing up the conical nut D upon the screw-threads of box B, so that the cone-shaped end of said nut shall engage with the oppositely-shaped lower ends of the spokes *a*, and inside the socket formed by the periphery of the ends of said spokes, and press them outwardly, forcing the fellies tightly against the tire, and, of course, holding the ends of the spokes firmly and tightly in the tenon-holes of the fellies and sockets of the nave or hub A.

To contract the fellies to meet a like contraction of the tire, and thus prevent what is called in common parlance "dishing," the conical nut D is unscrewed a sufficient distance and the bolt *d* is screwed up into nut *d'*, bringing the felly-sections *b b* nearer together, thus relieving the strain upon the tire and forcing the lower ends of spokes *a* downward until their beveled ends fit tightly upon the conical end of the nut D. The screw-bolts holding flange C must of course be slackened to admit of the free movement of spokes *a* in the sockets of nave A, and when said spokes are in proper position must be screwed up again tightly.

Having thus fully described my invention, what I claim as new, and desire to secure by Letters Patent, is—

The combination of the hub A, having the box B formed as a part thereof, the conical nut D, the spokes *a*, and the plate C, substantially as shown.

In testimony whereof I affix my signature in presence of two witnesses.

ZEBULON SPRAGUE.

Witnesses:
 JOSHUA B. WEBSTER,
 ELIHU B. STOWE.